United States Patent [19]

Mullis

[11] Patent Number: 4,739,862

[45] Date of Patent: Apr. 26, 1988

[54] PRESSURE LUBRICATOR

[76] Inventor: H. Leon Mullis, 4704 W. Charles Page Blvd., Tulsa, Okla. 74127

[21] Appl. No.: 842,198

[22] Filed: Mar. 21, 1986

[51] Int. Cl.⁴ .................. F01M 5/00; F01M 11/00; F16N 11/10

[52] U.S. Cl. .................................... 184/6.22; 184/26

[58] Field of Search ............... 184/6.13, 6.21, 6.22, 184/6.28, 105.1, 6, 39.1, 55.1, 26; 415/175

[56] References Cited

U.S. PATENT DOCUMENTS

| | | | |
|---|---|---|---|
| 1,136,219 | 4/1915 | Dunham | 184/6.22 |
| 1,409,868 | 3/1922 | Kien | 418/201 |
| 1,464,828 | 8/1923 | Parsons | 184/6.22 |
| 2,664,173 | 12/1953 | Karig | 184/6.22 |
| 3,191,719 | 6/1965 | Waddell | 184/39.1 |
| 4,002,224 | 1/1977 | Easter | 184/6.11 |
| 4,074,752 | 2/1978 | Schlosberg | 184/6.22 |
| 4,186,654 | 2/1980 | Scott | 184/18 |
| 4,245,465 | 1/1981 | Milo | 184/6.11 |
| 4,390,082 | 6/1983 | Swearingen | 184/6.11 |
| 4,444,292 | 4/1984 | Brown | 184/6.22 |
| 4,513,704 | 4/1985 | Evans | 184/6.3 |

Primary Examiner—Carlton R. Croyle
Assistant Examiner—Jane E. Obee
Attorney, Agent, or Firm—Robert B. Stevenson

[57] ABSTRACT

A pressure lubricator for lubricating and cooling mechanical seals comprising a vertical high pressure vessel containing a lubricant/coolant liquid maintained at high pressure by a blanket of compressed gas supplied to the top of the vessel and a motor driven pump at the base of the vessel to circulate the lubricant/coolant liquid to the mechanical seals and then back to the vessel. Such a pressure lubricator is effective in lubricating and cooling mechanical seals with minimum energy input and minimum risk associated with loss of power to the pump.

6 Claims, 4 Drawing Sheets

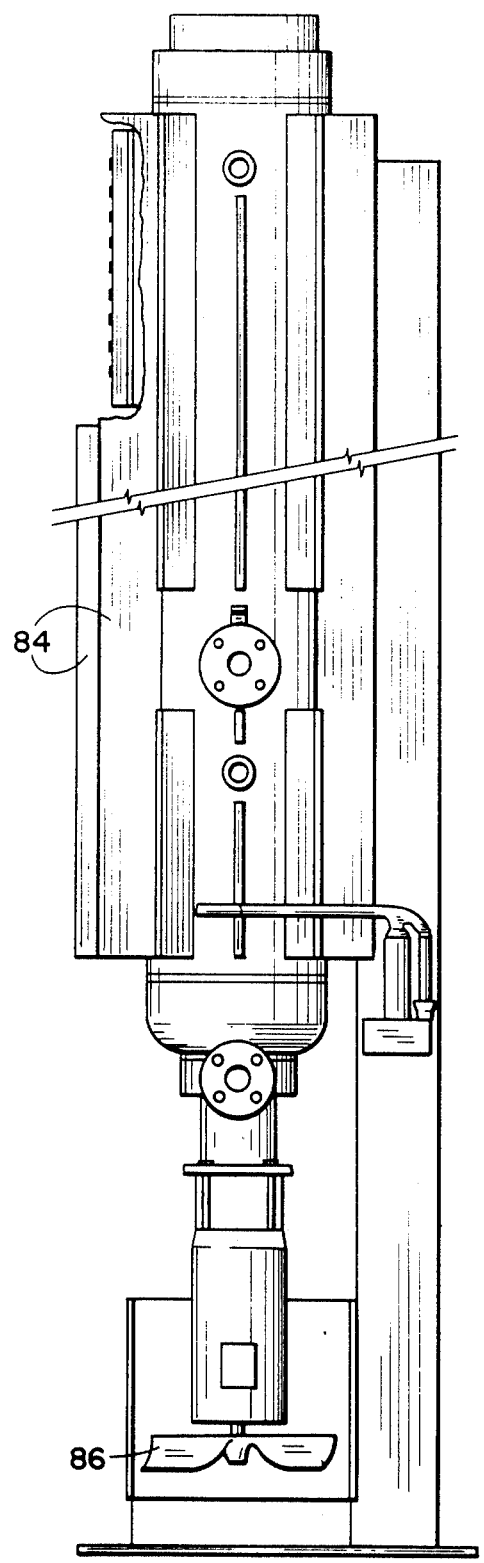
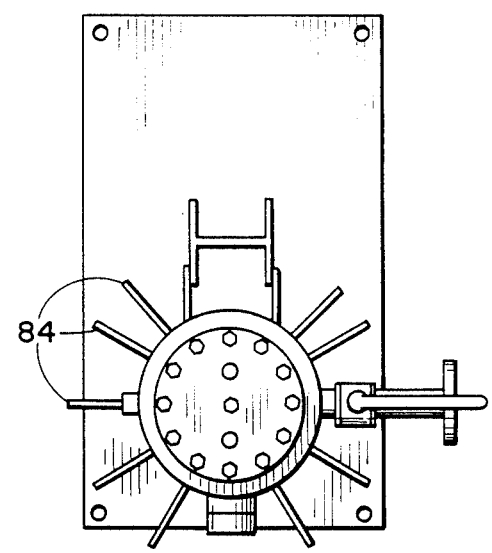
Fig. 5
Fig. 4

PRESSURE LUBRICATOR

BACKGROUND OF THE INVENTION

1. Field of the Invention

This invention relates to pressure lubricators for providing lubrication and cooling to mechanical seals. More specifically, but not by way of limitation, the invention relates to a pressure lubricator with a high pressure reservoir and circulating pump that deliver cooling and lubricating fluid to the backside of a pump shaft seal and the like.

2. Description of the Prior Art

The basic concept of supplying a lubricating and cooling medium at high pressures to the mechanical seals of stuffing boxes for pumps, compressors and the like is generally known. Typically, the pressure lubricator is either a gravity fed system employing a pressurized reservoir for small applications while larger systems employ high pressure pumps to achieve the desired flow rate. In such large systems, the energy input and capital investment is significant, while a power or mechanical failure in the pressure lubricating system results in loss of pressure on the backside of the mechanical seal being serviced by the pressure lubricator, thus jeopardizing the pump, compressor or similar device being serviced.

SUMMARY OF THE INVENTION

In view of the limitations and problems associated with previous pressure lubricators, the present invention provides an improved system for lubricating and cooling mechanical seals and the like. The improved method and apparatus according to the present invention employs a reservoir of lubricant/coolant liquid maintained at high pressure by a blanket of compressed gas over the liquid within the reservoir with a circulating pump at the base of the reservoir to deliver the liquid to the mechanical seals.

Thus, the present invention provides a pressure lubricator for cooling and lubricating mechanical seals comprising:

(a) a substantially vertical high pressure vessel;
(b) a lubricant/coolant liquid confined in the high pressure vessel;
(c) a high pressure gas cylinder connected to the top of the high pressure vessel such as to maintain a high pressure gas phase within the vessel;
(d) a motor driven pump with the inlet of the pump in fluid communication with the lubricant/coolant liquid at the bottom of the high pressure vessel; and
(e) a closed fluid recirculation loop in fluid communication from the outlet of the motor driven pump to the mechanical seals to be lubricated and cooled and then back to the high pressure vessel.

It is an object of the present invention to provide a pressure lubricator that has an integral lubricant/coolant reservoir and pump assembly that is maintained continuously at high pressures characteristic of the pressure required to protect the mechanical seals being serviced without relying on a high pressure pump. It is a further object to provide a pressure lubricator that is relatively inexpensive and economical to use and that does not involve a significant catastrophic risk to the mechanical seal system being serviced upon cessation of pumping or power failure and the like. Fulfillment of these objects and the presence and fulfillment of additional objects will become apparent upon complete reading of the specification and claims taken in conjunction with the attached drawings.

BRIEF DESCRIPTION OF THE DRAWINGS

FIG. 4 is a partial cut-away right side view of the alternate embodiment of the pressure lubricator of FIG. 3 less the upper pressure gauge.

FIG. 5 is a top view of the pressure lubricator of FIG. 4.

DESCRIPTION OF THE PREFERRED EMBODIMENTS

Figure 1:
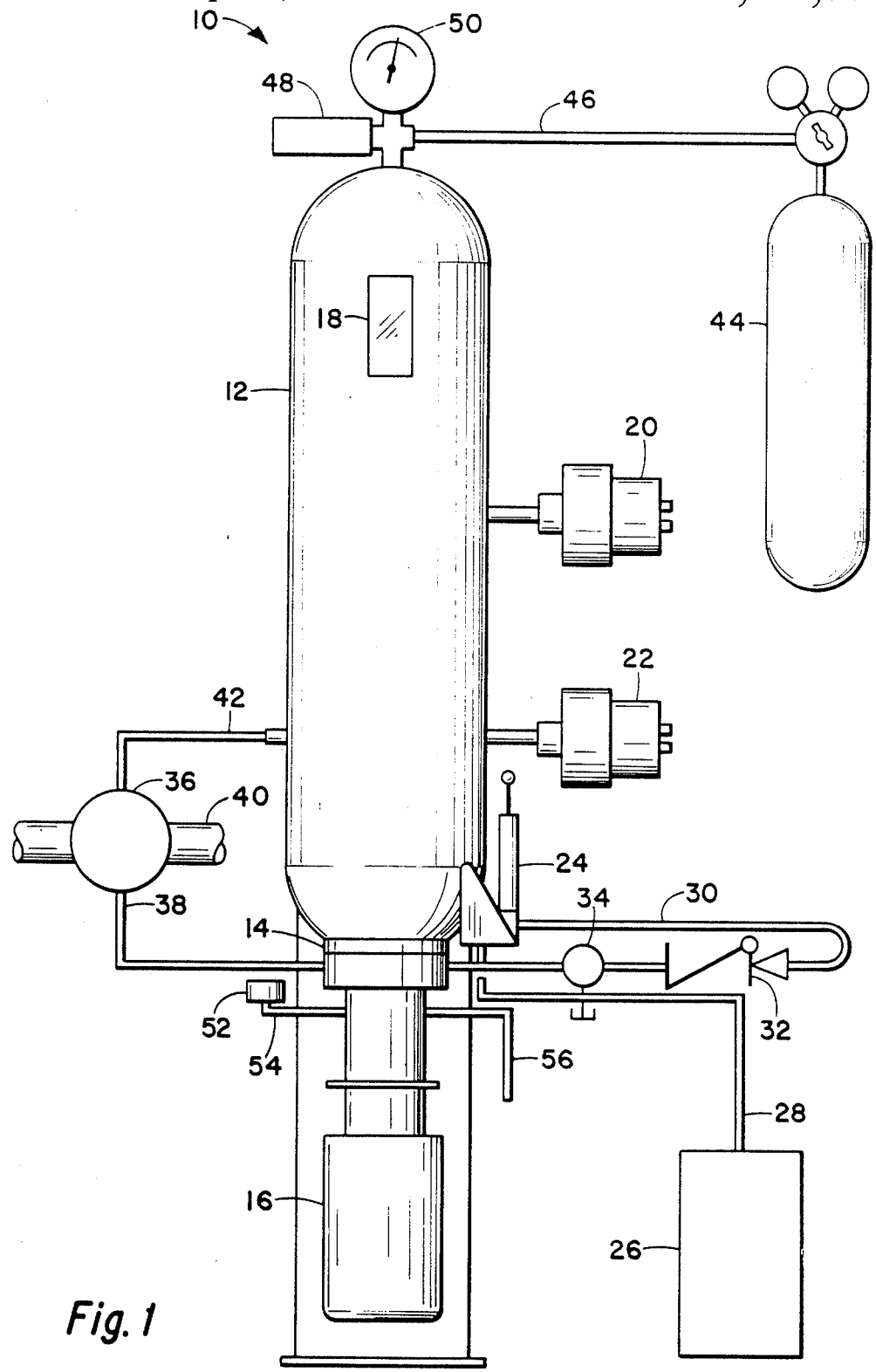
FIG. 1 is a schematic illustration of a typical pressure lubricator according to the present invention.

The improved pressure lubricator and improved method of lubricating and cooling mechanical seals according to the present invention, how the present invention differs from the prior art and the advantages associated with its use can perhaps be best explained and understood by reference to the drawings. FIG. 1 illustrates the overall concept of both a typical pressure lubricator and method of lubricating and cooling of mechanical seals according to the present invention. As illustrated in FIG. 1, the pressure lubricator, generally designated by the numeral 10, involves a substantially vertical buffer fluid reservoir 12 confining a lubricator/coolant liquid (not shown) therein. This fluid reservoir 12 is equipped with a pump 14 located at and integrally attached to the bottom of the reservoir 12 with a pump drive motor 16 positioned below the pump 14 and reservoir 12.

The reservoir 12 is further equipped with a sight gauge 18 such as to visually control and maintain the desired buffer fluid level within the reservoir. Optionally, the reservoir has a pair of level controllers 20 and 22 positioned below the sight gauge 18. The top level controller 20 is used to trigger an alert status (not shown) for indicating when to add make-up buffer fluid. The lower level controller 22 is employed as an emergency shut-down signal generator (again, not shown) to turn down the system by shutting off the pump 14 when buffer fluid has become critically low. Because of the overall nature of the operation and design of the pressure regulator according to the present invention, such a shut-down and cessation of pumping does not result in the loss of high pressure at the mechanical seals (as explained later). As such, the shut-down because of low fluid level or even a power shut-off to the pump does not represent as great a risk as the prior art systems. This is one of the features that is felt to distinguish the present invention from the prior techniques and equipment.

Whenever low buffer fluid level is detected by any of the methods provided for (i.e., visually or by level controller) a hand operated pump 24 is used to manually pump auxiliary buffer fluid from the lubricant/coolant make-up vessel 26 via conduit 28 to the manual pump 24 and then via line 30 through one way check valve 32 and manual drain valve 34 to the inlet or suction side of pump 14 and hence, into reservoir 12.

The outlet of pump 14 is connected to the pump seal chamber 36 via line 38. Pump seal chamber 36 is illustrated schematically or conceptually as having a pump shaft 40 passing therethrough and making contact therein with the mechanical seals immersed in protective lubricant/coolant circulating therethrough (not shown). The fluid then exits the seal chamber 36 via line 42 and returns to reservoir 12 wherein it is cooled and recirculated through this external loop. Thus, the pump 14 continuously uses this external loop to deliver lubricant and coolant to the mechanical seals to be protected during use of the pressure lubricator.

In order to maintain high pressure within the system at all times, independent of shut-down or power failure or low buffer fluid level, the top of reservoir 12 is supplied with an inert or non-reactive compressed gas from gas cylinder 44 via line 46 to pressure switch 48 which is equipped with pressure gauge 50. In this manner, a high pressure gas phase or gas blanket is maintained within the top of the high pressure reservoir 12 which in turn maintains a state of high pressure throughout the fluid circuits associated with the pressure lubricator 10.

Between the pump 14 and motor 16 is a lubricant reservoir 52 that is in fluid communication with the bearings on the motor/pump shaft via conduit 54 and a separate conduit 56 that drains the back side of the pump shaft seals. Periodically, the lubricant reservoir 52 is filled by packing lubricant into the reservoir 52. Preferably, the reservoir 52 is spring biased such as to maintain positive lubricant at the motor/pump shaft bearing during operation.

Figure 2:
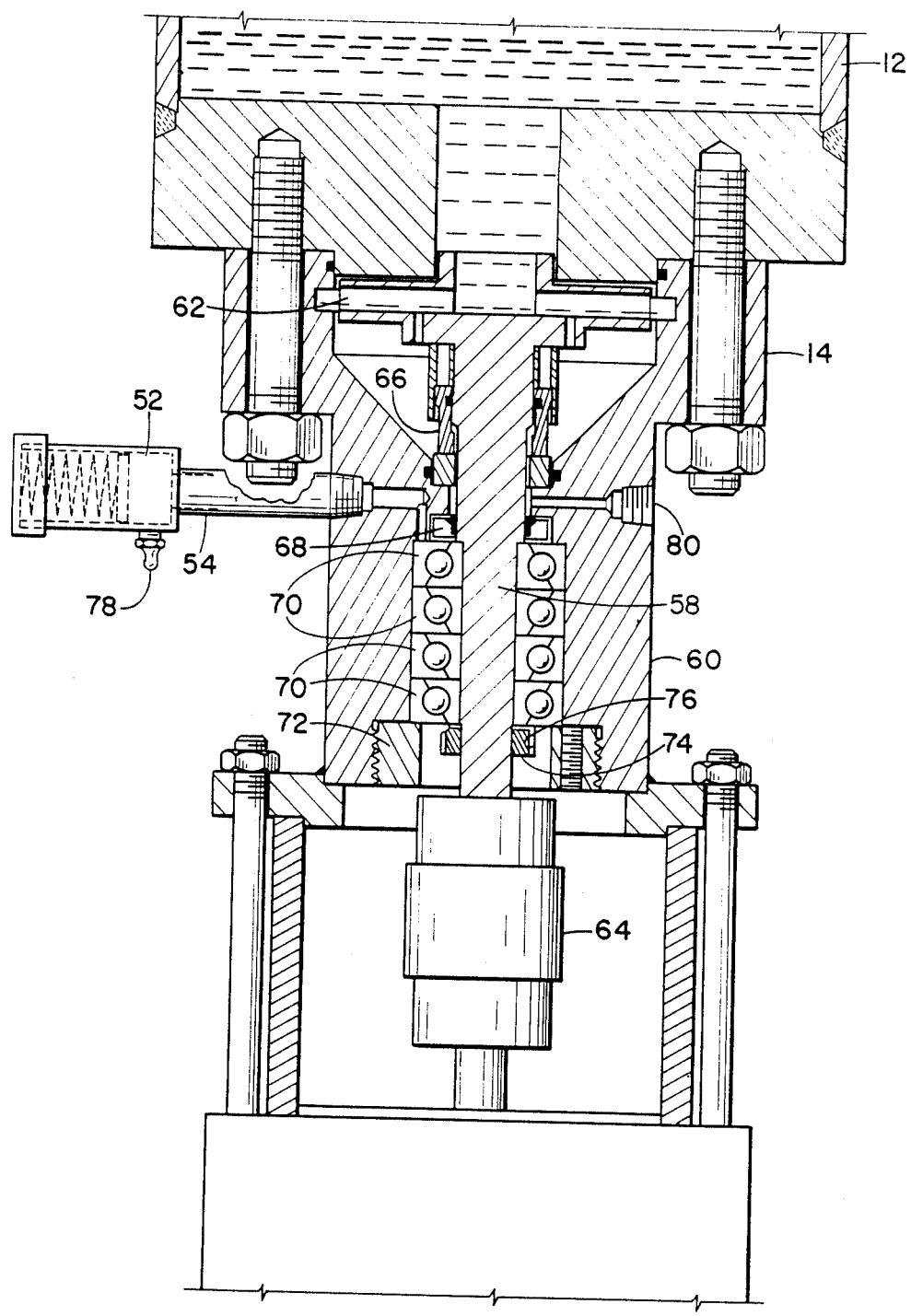
FIG. 2 is a cross-sectional view of a typical pressure lubricator pump assembly according to the present invention.

FIG. 2 illustrates in more detail a typical pressure lubricator pump located at the bottom of the high pressure lubricant/coolant fluid reservoir. In describing the pump, the numbers employed in FIG. 1 are preserved and used for corresponding components whenever possible. Thus, as seen in FIG. 2, the pump 14 is integrally attached to the reservoir 12 with a pump shaft 58 passing through pump housing 60 and terminating internally with a conventional centrifugal impeller 62 and terminating externally with a motor shaft coupling 64. Between the impeller 62 and the motor coupling 64 is an internal seal system 66, an oil seal 68, a series of bearings 70, bearing retainer 72, bearing nut 74 and bearing nut lock washer 76. As illustrated, the buffer fluid in vessel 12 is gravity fed to the top center of the impeller 62 and then forced out of the pump 14 via line 38 (not shown, see FIG. 1). The lubrication of the bearings 70 is further illustrated in FIG. 2 wherein reservoir 52 is periodically filled via greating fitting 78 such that a continuous stream of lubricant is directed through conduit 54 to bearings 70 during operation of the pump and motor. The annulus around the pump shaft 58 between impeller pump seal 66 and pump bearing seal 68 is further equipped with an external drain port 80 that leads to conduit 56 (see FIG. 1).

As can be seen in FIGS. 1 and 2, the motor 16 driving pump 14 does not operate with a significant pressure drop across the intake and outlet of the pump. As such, the power required to circulate the lubricant/coolant buffer fluid to the mechanical seals is nominal. Thus, there is a significant capital investment saving and a power consumption saving when employing the pressure lubricator according to the present invention relative to the prior art devices even when delivering relatively large volumes of buffer fluid at high pressures. This feature in combination with the reduced risk of catastrophic failure associated with the turn down or power loss represents a significant advantage when using the pressure lubricator according to the present invention relative to prior art processes and apparatus.

Figure 3:
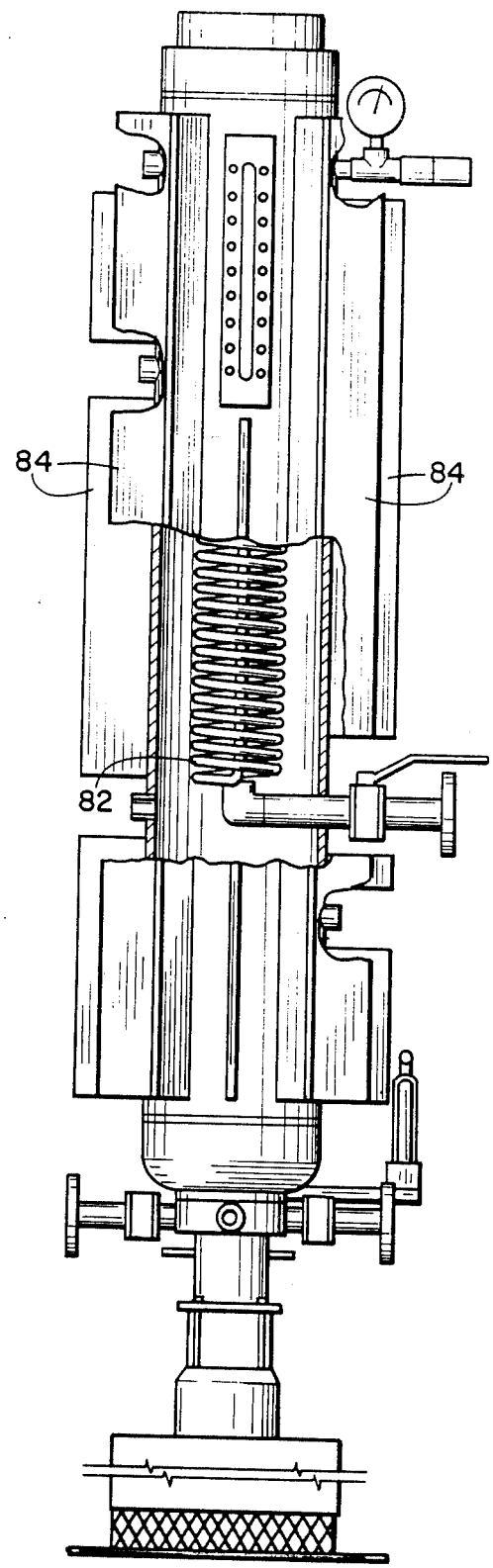
FIG. 3 is a partial cut-away view of an alternate embodiment of a pressure lubricator according to the present invention.

FIGS. 3, 4 and 5 illustrate a specific alternate embodiment of a pressure lubricator according to the present invention wherein the buffer fluid reservoir 12 is equipped with an internal cooling coil 82 and a plurality of external heat exchanger fins 84. In this manner, reservoir 12 containing the hot buffer fluid (i.e., the lubricant/coolant liquid returning from mechanical seals being serviced) can be cooled by circulating a coolant through cooling coil 82.

As further seen in FIG. 4, the bottom of the pump motor of this specific alternate embodiment is further equipped with an air fan 86, driven by the pump motor, such as to blow cooling air upwardly around the vessel and exchanger fins 84 such as to contribute additional cooling to the reservoir and the fluid contained therein.

The actual construction and selection of material used in fabricating the pressure lubricator according to the present invention can be by any of the methods and out of any of the conventional material generally known in the art. The selection will vary from application to application and vary according to the type of lubricant/coolant being circulated. Broadly, the selection of lubricant/coolant can vary from a hydrocarbon buffer fluid to water based fluid as well as concentrated sulfuric acid or other chemicals as again generally known in the art. Preferably, a light weight oil (e.g., 5 w) is used in an essentially carbon steel unit for many industrial applications. Experience indicates that such a system as disclosed in FIGS. 3, 4 and 5 can be powered by a 1½ hp, 1725 rpm electric motor at operating pressure from 1500 psi to 2300 psi and reservoir capacities of from about 3 to 15 gallons and meet many of the conventional industrial pump seal and compressor seal requirements.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. A method of lubricating and cooling mechanical seals at high pressure comprising the steps of:
   (a) confining a lubricant/coolant liquid to a high pressure vessel;
   (b) maintaining a high pressure gas phase over the top of said confined lubricant/coolant liquid within said high pressure vessel;
   (c) providing a motor driven pump and closed fluid recirculation loop in fluid communication from said lubricant/coolant liquid maintained at high pressure within said high pressure vessel to the mechanical seals to be lubricated and cooled and then back to said high pressure vessel; and
   (d) pumping said lubricant/coolant liquid through said closed fluid circulation loop, thus cooling and lubricating the mechanical seals at high pressure with minimum energy input to said pump.

2. A method of claim 1 further comprising the steps of:
   (a) providing the motor of said motor driven pump with an air fan being driven by said motor; and (b) blowing air by said fan over said high pressure vessel such as to cool said high pressure vessel and lubricant/coolant liquid contained therein.

3. A method of claim 1 further comprising the steps of:
(a) providing said vessel with a cooling coil; and
(b) circulating a liquid coolant through said cooling coil such as to cool said high pressure vessel and lubricant/coolant liquid contained therein.

4. A pressure lubricator for cooling and lubricating mechanical seals comprising:
(a) a substantially vertical high pressure vessel;
(b) a lubricant/coolant liquid confined in said high pressure vessel;
(c) a high pressure gas cylinder connected to the top of said high pressure vessel such as to maintain a high pressure gas phase within said vessel;
(d) a motor driven pump with the inlet of said pump in fluid communication with the lubricant/coolant liquid at the bottom of said high pressure vessel; and
(e) a closed fluid recirculation loop in fluid communication from the outlet of said motor driven pump to the mechanical seals to be lubricated and cooled and then back to said high pressure vessel.

5. A pressure lubricator of claim 4 wherein said motor driven pump further comprises an air fan driven by said motor such as to direct air upwardly around said substantially vertical high pressure vessel such as to cool said vessel and said liquid confined therein.

6. A pressure lubricator of claim 4 wherein said high pressure vessel further comprises a cooling coil circulating a coolant to cool said vessel and said liquid confined therein.

* * * * *